(12) United States Patent
Hwang

(10) Patent No.: US 9,978,281 B2
(45) Date of Patent: May 22, 2018

(54) PARKING GUIDE LINE DEVICE AND DISPLAYING METHOD

(71) Applicant: HYUNDAI MOBIS Co., Ltd., Yongin-si, Gyeonggi-do (KR)

(72) Inventor: Sung Kyung Hwang, Yongin-si (KR)

(73) Assignee: HYUNDAI MOBIS CO., LTD., Yongin-si, Gyeonggi-do (KR)

( * ) Notice: Subject to any disclaimer, the term of this patent is extended or adjusted under 35 U.S.C. 154(b) by 359 days.

(21) Appl. No.: 14/552,544

(22) Filed: Nov. 25, 2014

(65) Prior Publication Data

US 2015/0170520 A1 Jun. 18, 2015

(30) Foreign Application Priority Data

Nov. 29, 2013 (KR) .................. 10-2013-0146718

(51) Int. Cl.
*B60R 1/00* (2006.01)
*G08G 1/16* (2006.01)
*H04N 7/18* (2006.01)
*G06K 9/00* (2006.01)
*G06T 7/70* (2017.01)

(52) U.S. Cl.
CPC ............ *G08G 1/168* (2013.01); *B60R 1/00* (2013.01); *G06K 9/00798* (2013.01); *G06T 7/70* (2017.01); *H04N 7/183* (2013.01); *B60R 2300/305* (2013.01); *B60R 2300/806* (2013.01); *G06T 2207/30244* (2013.01); *G06T 2207/30264* (2013.01)

(58) Field of Classification Search
CPC ........ B60R 2300/305; B60R 2300/806; G06K 9/00798; G06T 2207/30244; G06T 2207/30264; G06T 7/004; G08G 1/168; H04N 7/183
USPC ........................................................ 348/118
See application file for complete search history.

(56) References Cited

U.S. PATENT DOCUMENTS

| | | | | |
|---|---|---|---|---|
| 6,611,744 B1 * | 8/2003 | Shimazaki | ............... | B60R 1/00 180/168 |
| 6,985,171 B1 * | 1/2006 | Kuriya | ..................... | B60R 1/00 340/435 |
| 7,307,655 B1 * | 12/2007 | Okamoto | ........... | G06K 9/00791 348/222.1 |
| 2002/0005779 A1 * | 1/2002 | Ishii | ..................... | B62D 15/027 340/436 |
| 2003/0165255 A1 * | 9/2003 | Yanagawa | ................ | B60R 1/00 382/104 |
| 2006/0255969 A1 * | 11/2006 | Sakakibara | .......... | B62D 15/029 340/932.2 |
| 2008/0024607 A1 * | 1/2008 | Ozaki | ..................... | G01S 7/497 348/148 |

(Continued)

*Primary Examiner* — Behrooz Senfi
(74) *Attorney, Agent, or Firm* — Paratus Law Group, PLLC

(57) ABSTRACT

A device for assisting rear parking of a vehicle including a rear view camera that is mounted on the rear of a vehicle; a display unit that displays an image taken by the rear view camera; a height measurer that measures the position of the rear view camera from the ground; an angle measurer that measures the inclination of the rear view camera from the ground; and an image processor that creates a parking guide line in the image taken by the rear view camera on the basis of information obtained by the height measurer and the angle measurer and outputs the parking guide line through the display unit.

7 Claims, 4 Drawing Sheets

(56) References Cited

U.S. PATENT DOCUMENTS

| | | | |
|---|---|---|---|
| 2008/0136912 A1* | 6/2008 | Iwano | G06T 1/0007 348/148 |
| 2010/0114434 A1* | 5/2010 | Kawabata | B60R 1/00 701/41 |
| 2010/0292886 A1* | 11/2010 | Szczerba | G01C 21/365 701/31.4 |
| 2011/0273310 A1* | 11/2011 | Kadowaki | B62D 15/0285 340/932.2 |
| 2012/0007985 A1* | 1/2012 | Inui | H04N 17/002 348/148 |
| 2012/0182426 A1* | 7/2012 | Fukuda | G06T 7/0042 348/148 |
| 2013/0010119 A1* | 1/2013 | Mitsugi | B60R 1/00 348/148 |
| 2015/0227806 A1* | 8/2015 | Oami | G06K 9/00221 348/222.1 |

* cited by examiner (A)

(B)

PARKING GUIDE LINE DEVICE AND DISPLAYING METHOD

CROSS-REFERENCE TO RELATED APPLICATION

This application claims the priority benefit of Korean Patent Application No. 10-2013-0146718, filed on Nov. 29, 2013 in the Korean Intellectual Property Office, the disclosure of which is incorporated herein by reference.

BACKGROUND

The present invention relates to a device for assisting rear parking of a vehicle and a method of displaying a guide line, and more particularly, to a device for assisting rear parking of a vehicle which can creates a parking guide line even if the angle of a rear view camera changes, because the rear view camera can obtain the angle information, and a method of displaying a guide line.

Recently, as vehicles are generally used, the number of vehicles has greatly increased over the ratio of one vehicle per family. Further, with the development of automotive technologies, recently, various high-tech electronic devices are mounted on vehicle or vehicles equipped with those electronic devices are released.

That is, vehicles, for example, equipped with a navigation device for guidance, an automotive black box for recording driving situations, and an automotive monitoring camera for compensating a blind spot of a driver have been generalized. As for automotive monitoring camera, a rear view camera showing the area behind a vehicle that a drive has difficulty in checking is generally used, and as for navigations or black boxes, they have the function of a rear view camera or a function cooperating with a rear view camera in some cases.

Such an automotive rear view camera ensures the view for the area behind a vehicle that a driver cannot see, so that it can not only simply help parking, but prevent a danger of an accident when a driver fails to see children or animals behind his/her vehicle and drives the vehicle backward. Accordingly, the rear view camera is recently considered as necessary equipment for a driver.

However, in the related art, although a rear distance guide line is displayed with the rear image taken by a rear view camera for the convenience of a driver, a parking guide line is fixed, so when the position or the angle of the camera changes, the accuracy for the actual parking guide line decreases.

SUMMARY

The present invention has been made in an effort to provide a device for assisting rear parking of a vehicle which can create a parking guide line, using information about the position and the angle of a rear view camera.

An aspect of the present invention provides a device for assisting rear parking of a vehicle which includes: a rear view camera that is mounted on the rear of a vehicle; a display unit that displays an image taken by the rear view camera; a height measurer that measures the position of the rear view camera from the ground; an angle measurer that measures the inclination of the rear view camera from the ground; and an image processor that creates a parking guide line in the image taken by the rear view camera on the basis of information obtained by the height measurer and the angle measurer and outputs the parking guide line through the display unit.

Another aspect of the present invention provides a method of displaying a parking guide line of a device for assisting rear parking of a vehicle which includes: measuring the height and angle of a rear view camera on the rear of a vehicle from the ground; taking an image of a predetermined area behind a vehicle through the rear view camera; mapping points in the image on a lens of the rear view camera; mapping the image mapped on the lens of the rear view camera on an image sensor of the rear view camera; and creating a parking guide line corresponding to the points mapped on the image sensor and outputting the parking guide line through a display unit.

The points in the image are changed into pixels and a parking guide line is created by connecting the pixels.

According to the device for assisting rear parking of a vehicle and the method of displaying a guide line, since a height measurer and an angle measurer are disposed in a camera, the position and the angle of the camera are measured by the height measurer and the angle measurer, and then a parking guide line is created, it is possible to receive accurate information for a parking guide line, even if a rear view camera is mounted at any position at any angle on the rear of a vehicle.

DETAILED DESCRIPTION

Figure 1:
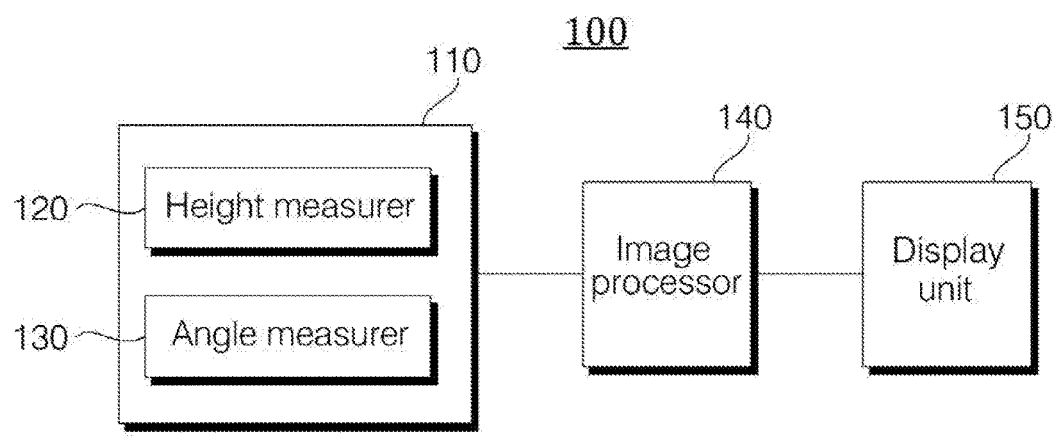
FIG. 1 is a block diagram showing a device for assisting rear parking of a vehicle according to an embodiment of the present invention.

Hereinafter, embodiments of the present invention will be described with reference to the accompanying drawings and the following description. However, the present invention is not limited to the embodiments described herein and may be achieved in other ways. On the contrary, the embodiments described herein are provided so that the present invention can be more clearly and fully understood and those skilled in the art can fully understand the spirit of the present invention. Like reference numerals are given to like components throughout the specification.

FIG. 1 is a block diagram showing a device for assisting rear parking of a vehicle according to an embodiment of the present invention.

As shown in FIG. 1, a device 100 for assisting rear parking of a vehicle includes: a rear view camera 110 taking an image of the area behind a vehicle; a height measurer 120 measuring the position of the rear view camera; an angle measurer 130 measuring the angle of the rear view camera; an image processor 140 providing an image for a driver by processing image information from the rear view camera 110 and information from the height measurer 120 and angle measurer 130; and a display unit 150 displaying the image produced by the image processor 140.

The rear view camera 110 may be mounted at any position on the bumper of a vehicle and various types of cameras may be used, depending on the configuration and the design cost of the device, as long as they satisfy image quality or resolution that do not make a driver difficult to recognize an image of the area behind a vehicle.

The rear view camera 110 includes an image sensor 160, the height measurer 120, and the angle measurer 130. The image sensor 160 may be mounted on the case of the height measurer 120 and the angle measurer 130, but may be provided separately from the rear view camera.

The height measurer 120 is disposed in the rear view camera 110 and measures the height of the rear view camera 110 on a vehicle from the ground.

Further, the height measurer 120 may be one of an ultrasonic sensor, an infrared sensor, a laser pointer, and a detector.

The angle measurer 130 is disposed in the rear view camera 110 and measures the angle of the rear view camera 110. The angle measurer 130 measures the angle of the rear view camera 110 from the ground and measures angles of all points in a predetermined rear area photographed by the rear view camera 110.

The angle measurer 130 may be a gyro sensor.

The rear view camera 110 takes an image of a predetermined rear area on the basis of information from the height measurer 120 and the angle measurer 130.

The image processor 140 creates an accurate parking guide line, using the image of the rear area taken by the rear view camera 110 and the data obtained by the height measurer 120 and the angle measurer 130, and the parking guide line is displayed by the display unit 150.

The display unit 150, a display device, outputs an image of a rear area taken by the rear view camera 110.

For the display unit 150, an individual display unit for taking an image of a rear area may be used, and in some cases, a navigation device or a portable TV in a vehicle may be used.

Figure 2:
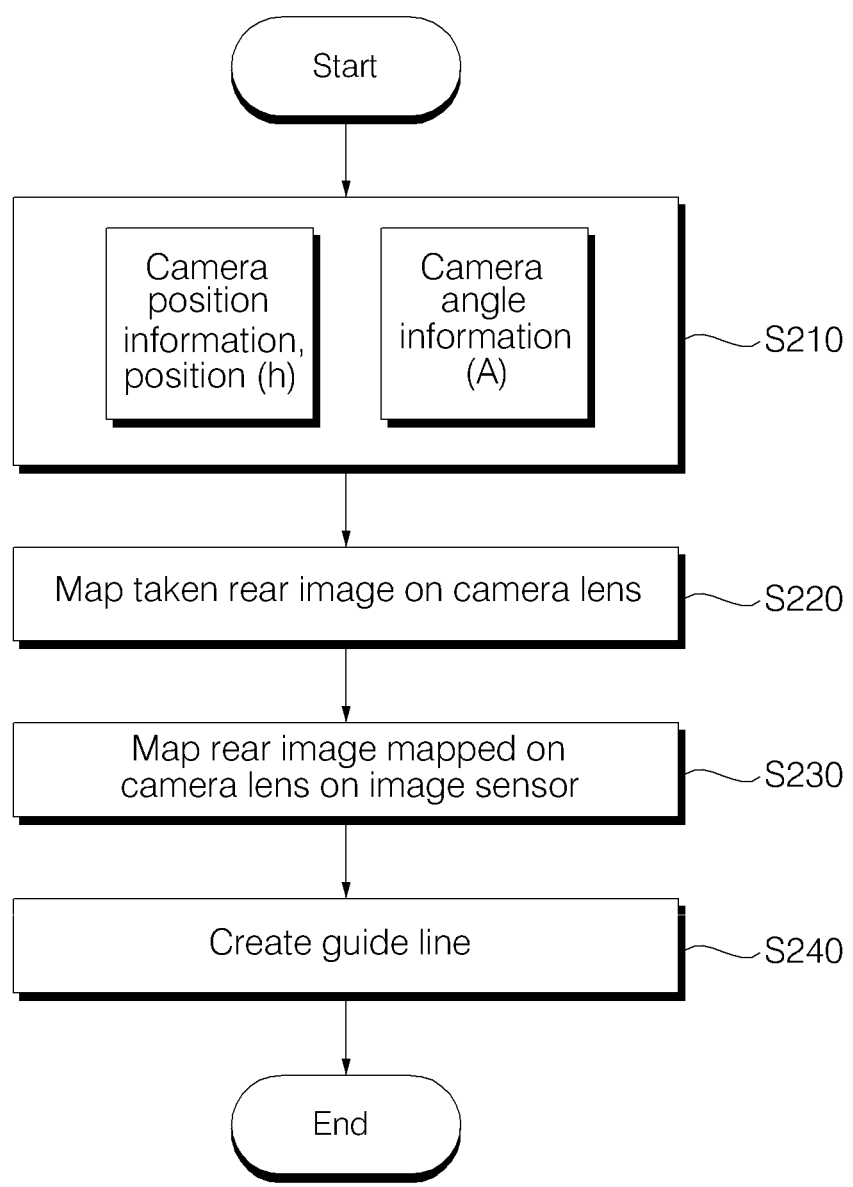
FIG. 2 is a flowchart showing the operation of the device for assisting rear parking of a vehicle according to an embodiment of the present invention.

FIG. 2 is a flowchart showing the operation of the device for assisting rear parking of a vehicle according to an embodiment of the present invention.

When a user drives a vehicle backward, the rear view camera 110 on the rear of the vehicle takes an image of a predetermine rear area.

The height measurer 120 in the rear view camera 110 measures the height of the rear view camera 110 on a vehicle from the ground. Further, the angle measurer 130 measures angles of all points in the rear area (S210).

The measured height h and the angle Ar of a point dr are described below with reference to FIG. 4.

The image processor 140 maps the point dr on a rear view camera lens 170 on the basis of the height h of the rear view camera 110 measured by the height measurer 120 and the angle Ar of the point dr measured by the angle measurer 130 (S220).

That is, it is possible to locate the point by reversely tracing position of the point mapped on the lens 170.

In the image of a predetermined rear area taken by the rear view camera 110, rear images are mapped on the lens 170 of the rear view camera 110, for a point calculated from the height h of the rear view camera measured by the height measurer 120 and the angles of the areas photographed by the rear view camera 110.

Thereafter, the rear image mapped on the lens 170 of the rear view camera 110 is mapped on the image sensor 160 in the rear view camera 110 (S230).

Rear images are mapped on the image sensor in accordance with the angle of the camera measured by the angle measurer 130 and the distance from the rear view camera lens to the image sensor.

Figure 3:
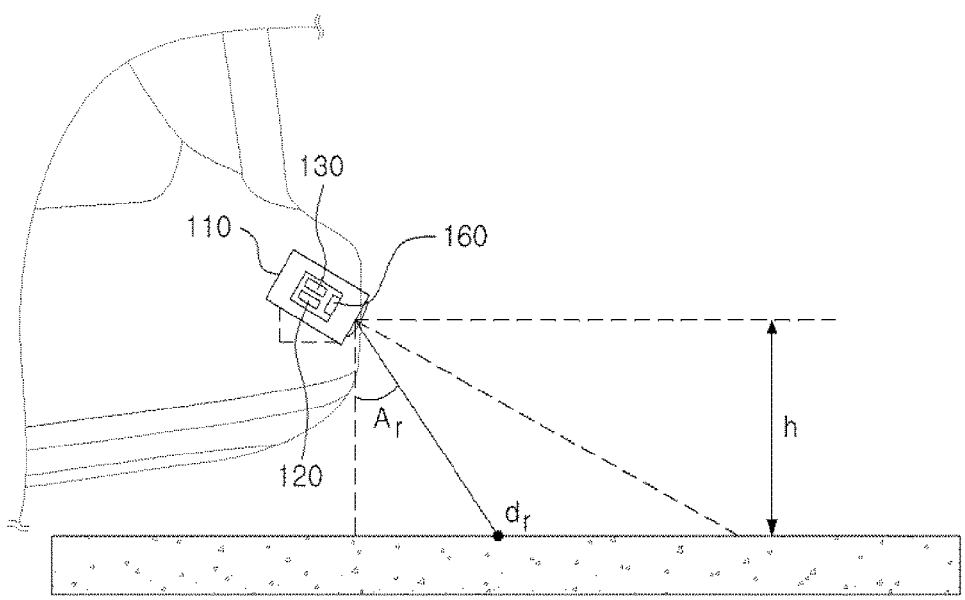
FIG. 3 is a diagram showing the device for assisting rear parking of a vehicle according to an embodiment of the present invention.

Accordingly, the image processor 140 creates a guide line for the rear image which corresponds to the measured height and angle of the camera (S240). FIG. 3 is a diagram showing the device for assisting rear parking of a vehicle according to an embodiment of the present invention and FIG. 4 illustrates diagrams showing mapping according to the angle of the rear view camera shown in FIG. 3.

As shown in FIG. 3, a rear view camera 110 is mounted on the rear of a vehicle.

The rear view camera 110 includes an image sensor 160, and as described above, includes a height measurer 120 and an angle measurer 130.

Assuming that a point in a rear area is the point dr, the angle Ar from the rear view camera 110 to the point dr is calculated on the basis of the height h measured by the height measurer 120.

The image processor 140 maps the point dr on a rear view camera lens on the basis of the height h of the rear view camera 110 measured by the height measurer 120 and the angle Ar of the point dr measured by the angle measurer 130.

Figure 4:
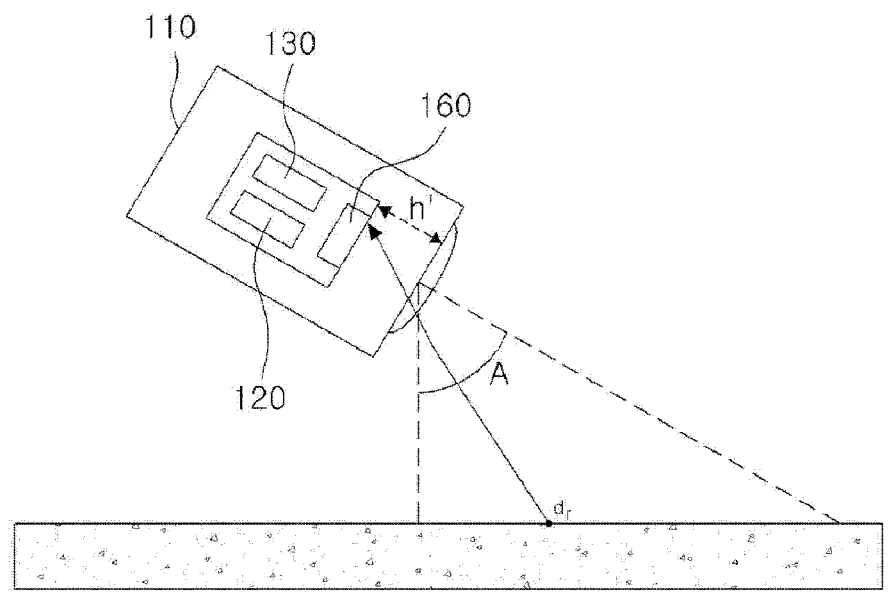
FIG. 4 illustrates diagrams showing mapping according to the angle of the rear view camera shown in FIG. 3.
Figure 4:
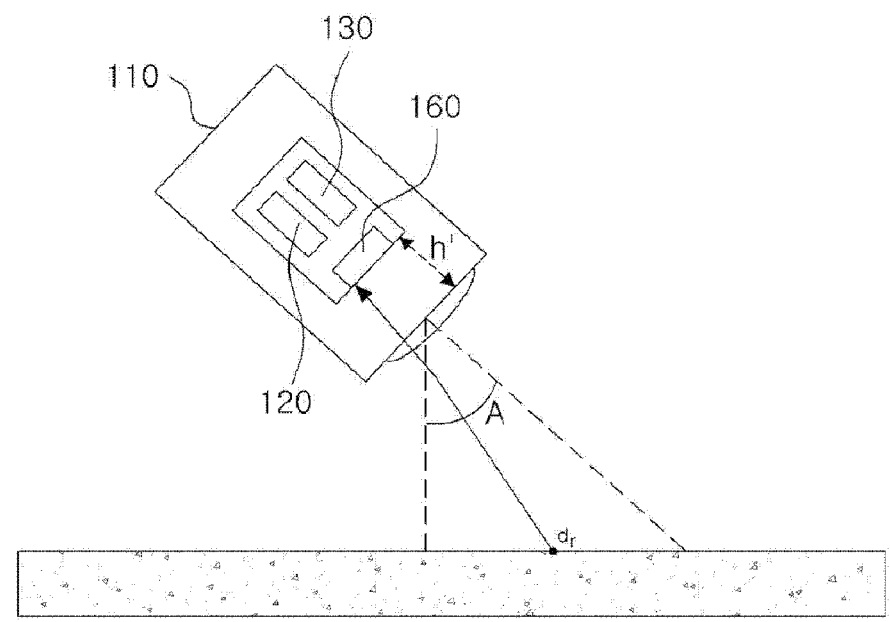

As shown in (A) of FIG. 4, rear images are mapped on the image sensor 160 on the basis of the angle A of the camera measured by the angle measurer 130 and the distance h' from the rear view camera to the image sensor 160.

The distance h' between the rear view camera and the image sensor 160 depends on the specification of the rear view camera lens, that is, may be different in accordance with the specification of the rear view camera lens.

Further, as shown in (B) of FIG. 4, the position of the point dr in the rear image which is mapped on the image sensor 160 through the rear view camera lens depends on the angle A of the rear view camera 110.

Accordingly, when rear points are mapped on the image sensor 160 through the rear view camera lens, the angle A of the rear view camera 110 should be measured by the angle measurer 130.

Finally, the image processor 140 changes the rear points mapped on the image sensor 150 into pixels and creates a parking guide line by connecting the pixels, and the parking guide line is displayed on the display unit 150.

Accordingly, since a height measurer and an angle measurer are disposed in a camera, the position and the angle of the camera are measured by the height measurer and the angle measurer, and then a parking guide line is created, it is possible to receive accurate information about a parking guide line, even if a rear view camera is mounted at any position at any angle on the rear of a vehicle.

Although a device for assisting rear parking of a vehicle of the present invention was described with reference to an embodiment, it is apparent to those skilled in the art that the present invention may be change and modified in various ways without departing from the scope of the present invention.

What is claimed is:

1. A device for assisting rear parking of a vehicle, comprising:
    a rear view camera that is mounted on a rear of a vehicle;
    a display unit that displays an image taken by the rear view camera;
    a height measurer that is mounted in the rear view camera and measures a height of the rear view camera from the ground;
    an angle measurer that is mounted in the rear view camera and measures an inclination angle of the rear view camera from the ground and inclination angles to points in the image taken by the rear view camera; and an image processor that creates a parking guide line in the image taken by the rear view camera based on information obtained by the height measurer and the angle measurer, and a distance from a rear view camera lens to an image sensor, and that outputs the parking guide line through the display unit, wherein the information includes the inclination angles to the points in the image measured by the angle measurer, wherein the image processor maps the points in the image on the rear view camera lens based on the height of the rear view camera measured by the height measurer and the inclination angles to the points in the image measured by the angle measurer.

2. The device of claim 1, wherein the image processor maps the image mapped on the rear view camera lens on the image sensor in the rear view camera, based on the inclination angle of the rear view camera measured by the angle measurer and the distance from the rear view camera lens to the image sensor.

3. The device of claim 2, wherein the image processor changes the points mapped on the image sensor into pixels and creates the parking guide line by connecting a plurality of pixels.

4. The device of claim 1, wherein the height measurer is mounted on the rear view camera and is any one of an ultrasonic sensor, an infrared sensor, a laser pointer, and a detector.

5. The device of claim 1, wherein the angle measurer is mounted on the rear view camera and is a gyro sensor.

6. A method of displaying a parking guide line of a device for assisting rear parking of a vehicle, the method comprising:

taking an image of a predetermined area behind the vehicle through a rear view camera mounted on a rear of the vehicle;

measuring height of the rear view camera on the rear of the vehicle from the ground using a height measurer mounted in the rear view camera;

measuring an inclination angle of the rear view camera from the ground and inclination angles to points in the image taken by the rear view camera using an angle measurer mounted in the rear view camera; and creating a parking guide line in the image based on information measured by the height measurer and the angle measurer, and a distance from a lens of the rear view camera, wherein the information includes the inclination angles to the points in the image measured by the angle measurer, and wherein the creating the parking guide line includes:

mapping the points in the image on the lens of the rear view camera, wherein the image is mapped on the lens based on the height of the rear view camera measured by the height measurer and inclination angles to the points in the image;

mapping the image mapped on the lens of the rear view camera onto an image sensor of the rear view camera, wherein the image is mapped on the image sensor based on the angle of the rear view camera and a distance from the lens of the rear view camera to the image sensor; and generating the parking guide line corresponding to the points mapped on the image sensor; and outputting the parking guide line through a display unit.

7. A method of displaying a parking guide line of a device for assisting rear parking of a vehicle, the method comprising:

taking an image of a predetermined area behind the vehicle through a rear view camera mounted on a rear of the vehicle;

measuring height of the rear view camera on the rear of the vehicle from the ground using a height measurer mounted in the rear view camera;

measuring an inclination angle of the rear view camera from the ground and inclination angles to points in the image taken by the rear view camera using an angle measurer mounted in the rear view camera;

creating a parking guide line in the image based on information measured by the height measurer and the angle measurer, and a distance from a lens of the rear view camera, wherein the information includes the inclination angles to the points in the image measured by the angle measurer, and wherein the creating the parking guide line includes:

mapping the points in the image on the lens of the rear view camera, wherein the image is mapped on the lens based on the height of the rear view camera measured in the measuring height and the inclination angles to the points in the image;

mapping the image mapped on the lens of the rear view camera onto an image sensor of the rear view camera; and generating the parking guide line corresponding to the points mapped on the image sensor by changing the points in the image into pixels and connecting the pixels in the image; and outputting the parking guide line through a display unit.

* * * * *